United States Patent
Jelenic et al.

(10) Patent No.: US 6,610,768 B1
(45) Date of Patent: Aug. 26, 2003

(54) CROSS-LINKING COMPOSITIONS

(75) Inventors: Jernej Jelenic, Schalkhaar (NL); Gerrit Frits Drost, Schalkhaar (NL); Frans Johannes Van Moorsel, Deventer (NL); Akio Ishiwatari, Onoda (JP); Akihiko Tkai, Ube (JP)

(73) Assignees: Akzo Nobel N. V., Arnhem (NL); Kayaku Akzo Corporation, Tokyo (JP)

( * ) Notice: Subject to any disclaimer, the term of this patent is extended or adjusted under 35 U.S.C. 154(b) by 0 days.

(21) Appl. No.: 09/424,496

(22) PCT Filed: May 20, 1998

(86) PCT No.: PCT/EP98/03170

§ 371 (c)(1),
(2), (4) Date: Jan. 28, 2000

(87) PCT Pub. No.: WO98/54249

PCT Pub. Date: Dec. 3, 1998

(30) Foreign Application Priority Data

May 27, 1997 (JP) .............................. 9-151717
Dec. 17, 1997 (EP) ............................ 97203983

(51) Int. Cl.[7] .................... C07C 409/00; C08K 5/05
(52) U.S. Cl. .................... 524/386; 524/388; 568/558
(58) Field of Search ................. 524/386, 388; 568/558

(56) References Cited

U.S. PATENT DOCUMENTS 5,245,084 A 9/1993 Groepper et al. ........... 568/558

FOREIGN PATENT DOCUMENTS

| DE | 19619509 | 11/1997 | ............ C08L/21/00 |
| EP | 227048 | 7/1987 | ............ C08K/5/14 |
| EP | 785229 | 7/1997 | ............ C08K/5/00 |
| WO | 94/29372 | 12/1994 | ............. C08J/3/22 |

OTHER PUBLICATIONS

Derwent Patent Abstract No. 94–097894/12 (1994).
Derwent Patent Abstract No. 95–261420/34 (1995).

*Primary Examiner*—Peter D. Mulcahy
(74) *Attorney, Agent, or Firm*—Richard P. Fennelly

(57) ABSTRACT

This application relates to compositions of cross-linking peroxides which have excellent storage stability, without exudation of peroxide taking place, which contain the organic peroxide in a high concentration, and which are easily blendable with a rubber to be cross-linked. The compositions are obtained by mixing a softening agent with a Brookfield viscosity of 10,000 poises or less at 60 ° C. with an organic peroxide, preferably in the presence of a filler, and optionally with further ingredients.

32 Claims, No Drawings

CROSS-LINKING COMPOSITIONS

The present invention relates to cross-linking compositions. More particularly, it relates to cross-linking compositions used for cross-linking thermoplastic resins and elastomers such as rubbers.

Thermoplastic resins such as copolymers of ethylene and ethylene vinyl acetate and elastomers such as ethylene propylene diene rubber and butadiene acrylonitrile copolymer are of high economic value because they generally are available at low cost and have acceptable physical and other properties. It is known to adapt some properties, like improvement of the heat resistance, to specific needs by cross-linking these thermoplastic resins and elastomers. Typically, this is achieved by contacting the resin and/or elastomer with a proper amount of an organic peroxide and heat-treating the mixture. This, rather simple, cross-linking process has been used extensively on an industrial scale.

However, numerous problems were encountered when organic peroxides as such were used in cross-linking processes of resins/elastomers. A major problem was found to be the proper distribution of the peroxide in the resin/elastomer prior to and during the cross-linking process. More specifically, proper homogenization of the peroxide and the elastomer, optionally together with other ingredients that are part of the elastomer formulation, requires thorough mixing at a temperature allowing mastication/mixing of the elastomer. This thorough mixing generally is not feasible. First of all, economic considerations stand in the way of a lengthy mixing process. Secondly, a reduction of the mixing time, e.g., by using more mixing energy or increasing the mixing temperature, generally is not possible because of the thermal instability of the organic peroxide. More particularly, when mixing the granulate and the elastomer in conventional mixing equipment, such as mixers, kneaders, and extruders, the already elevated temperature of the elastomer increases due to the mixing energy. A too high mixing energy leads to an unacceptable temperature increase, resulting in premature decomposition of the peroxide, which is undesired from both a quality and a safety point of view.

To reduce this problem, the skilled person generally makes use of a powdery formulation of an organic peroxide on an inactive filler carrier (i.e. a filler that is inert during the processing of an elastomer, such as calcium carbonate, silica, clay, etc.). Alternatively, use is made of sheet-like or granular masterbatches, i.e. formulations of one or more peroxides and one or more resins and/or rubbers the peroxide concentration of which is greater than is desired in the cross-linking process. Such a masterbatch is detailed in, for instance, JP-07165990-A, where 10–50% of a peroxide is dispersed in a H-NBR.

However, such formulations still suffer from various drawbacks. To further improve masterbatches, JP-06049225-A proposes to also incorporate 2,4-diphenyl-4-methyl-1-pentene. In the international patent application published as WO94/29372 it is proposed to make compositions of peroxides, EP(D)M, and a polyoctenamer compound. European Patent application 227 048 discloses the use of blends of two polymers having different melt temperatures as the carrier for peroxide compounds such as dicumyl peroxide.

Furthermore, if a conventional powdery masterbatch is used, such a masterbatch will lower the kneadability (increase the viscosity) of the elastomer due to the presence of the inactive filler. Therefore, the improved dispersibility during initial mixing with the resin/rubber typically is offset by increased kneading times due to the decreased kneadability. Also, dust is easily liberated during the kneading, which may adversely affect the working environment.

The alternative sheet-like or granular masterbatches, as obtained for example by kneading and impregnating EPM or EPDM with a Mooney viscosity of about 20 to 150 (ML1+4 at 100° C.) with a peroxide, typically suffer from increasing hardness over time. Accordingly, when stored for a prolonged time, it is more and more difficult to disperse them in the elastomer to be cross-linked and a homogeneous (uniform) cross-linked resin/rubber product is difficult to obtain. Also, it is often observed that organic peroxides which are solid at 25° C. migrate to the surface of such a masterbatch, which process is known as blooming. Such blooming, leading to the formation of solid pure peroxide on the surface of said masterbatch, can result in the collection of pure peroxide in the package, which is undesired from a safety as well as a quality point of view. In the case of masterbatches of organic peroxide which are liquid at 25° C. it is known that the peroxide migrates to the surface of the masterbatch during storage, which is known as bleeding. As discussed for blooming, bleeding likewise leads to contamination of the containers and the handling equipment with pure peroxide, which is undesired from a safety point of view. Also, it is unlikely that the liquid organic peroxide will be homogeneously distributed throughout the masterbatch in a container. This is undesired since in that case quality control of the cross-linking process will become problematic. Hereinafter the term exudation is used for both the bleeding and the blooming phenomenon.

Furthermore, sheet-like or granular cross-linking agent masterbatches according to the prior art were found to be limited, in practice, to products with a maximum organic peroxide content of about 40 wt. %, while higher concentrations are desired from an economic point of view.

Moreover, conventional peroxide formulations typically suffer from 1) the necessity to use expensive processes to make such masterbatches, since they often contain a poorly processable elastomeric carrier, 2) the use of relatively expensive further additives, and/or 3) the presence of a particular elastomer/polymer in the masterbatch which limits its use to cross-linking processes where this elastomer is acceptable.

Hence there is a need for peroxide compositions not suffering from these disadvantages.

We have now found that, surprisingly, cross-linking organic peroxide compositions can be produced which are easily blended into elastomers, are widely acceptable in elastomer formulations, comprise relatively inexpensive compounds, and are easily produced at lower temperatures. Preferred compositions are "soft granular" as explained below. When the compositions according to the invention, and in particular the preferred soft granulates, are compared with masterbatch compositions according to the prior art, they show comparable mixing behaviour when blended with an elastomer, reduced exudation, and, if so desired, a high organic peroxide content. Compared with formulations consisting essentially of peroxide and filler, they show exceptionally good mixing behaviour and reduced exudation and, for formulations of solid peroxides, friability. They were found to be very suitable for use in cross-linking processes of resins and elastomers, particularly those involving cross-linking of EPM and/or EPDM.

The compositions according to the convention comprise a particular carrier material, which hereinafter is called a softening agent, having a Brookfield viscosity of 10,000 poises or less at 60° C. Preferably, the Brookfield viscosity of said softening agent is at least 5, preferably at least 500, and more preferably more than 5000 mPa·s at 20° C., for improved blendability with the rubber to be cross-linked. Depending on the peroxide to be comprised and the presence of optional further materials, preferred softening agents are alkylbenzenes, EP(D)M, and other low molecular weight polymers with said viscosity, hereinafter called liquid low molecular weight polymers, such as liquid EPM, liquid EPDM, and liquid isobutylene. Most preferred softening agents are free of aromatics and, more preferably, selected from liquid low molecular weight polymers.

It is noted that DE 196 19 509 discloses the use of liquid EPM in formulations for rubber chemicals in general. However, in these formulations a large quantity of trans-polyoctenamer is used. There are several disadvantages associated with the use of trans-polyoctenamers, in particular the price/performance ratio. Surprisingly, the compositions according to the invention can be produced without said trans-polyoctenamers being used.

Accordingly, the invention relates to a cross-linking composition comprising an organic peroxide and a softening agent with a Brookfield viscosity of 10,000 Poises or less at 60° C., with the proviso that the composition is essentially free of trans-polyoctenamer.

Preferably, the cross-linking composition comprises 20 to 80 wt. % (wt. %), preferably 30–80 wt. %, more preferably 30–60 wt. % of organic peroxide, a softening agent, and, if so desired, further additives, up to a total of 100 wt. %.

More preferably, the cross-linking composition is a soft granulate comprising at least one cross-linking peroxide, at least one filler, and an effective amount of at least one softening agent selected from the group consisting of low-molecular weight polymers, alkylbenzenes, plasticizers, and waxes with a viscosity between 5 mPa·s at 20° C. and 60,000 mPa·s at 100° C. Even more preferred are cross-linking compositions containing just peroxide, softening agent and filler, since such compositions were found to be widely utilizable, having good properties and a desirable price/performance ratio.

The cross-linking peroxides that can be formulated according to the present invention are the conventional products used in this application. It is preferred that these peroxides have a 10-hour life temperature at a temperature above 60° C. Also, these peroxides preferably have a melting point which is at least 15° C. below the decomposition temperature of the peroxide. Typical examples of cross-linking peroxides are 2,5-(tert-butylperoxy)-2,5-dimethylhexyne-3, di-tert-butyl peroxide, di-tert-amyl peroxide, 2,5-(tert-butylperoxy)-2,5dimethylhexane, tert-butyl cumyl peroxide, tert-butyl (m,p)-isopropylcumyl peroxide, cumyl (m,p)-isopropylcumyl peroxide, di-(m,p)-isopropylcumyl peroxide, (m and/or p) bis(tert-butylperoxyisopropyl) benzene, 1,3,5-tris(tert-butylperoxyisopropyl) benzene, dicumyl peroxide, 4,4-di-(tert-butylperoxy)butylvalerate, ethyl-3,3-di-(tert-butylperoxy) butyrate, 1,1-di-(tert-butylperoxy)-3,5,5-trimethylcyclohexane, 1,1-di-(tert-amylperoxy)-3,5,5-trimethylcyclohexane, 1-tert-butylperoxy-1-tert-amylperoxy-3,5,5-trimethylcyclohexane, 1,1-di-(tert-butylperoxy) cyclohexane, 1,1-di-(tert-amylperoxy) cyclohexane, 1-tert-butylperoxy-1-tert-amylperoxy cyclohexane, 2,2-di-(tert-butylperoxy) butane, 2,2-di-(tert-amylperoxy) butane, 2-tert-butylperoxy-2-tert-amylperoxy butane, tert-butyl peroxybenzoate, tert-amyl peroxybenzoate, tert-butylperoxy-2-methyl benzoate, tert-butylperoxy-4-methyl benzoate, tert-amylperoxy-2-methyl benzoate, dibenzoyl peroxide, bis(2,4-dichlorobenzoyl) peroxide, bis(4-methylbenzoyl) peroxide, and mixtures thereof.

More preferred peroxides to be used in the granulated compositions according to the invention are 2,5-(tert-butylperoxy)-2,5-dimethylhexyne-3, di-tert-butyl peroxide, 2,5-(tert-butylperoxy)-2,5-dimethylhexane, tert-butyl cumyl peroxide, (m and/or p) bis(tert-butylperoxyisopropyl) benzene, dicumyl peroxide, 4,4-di-(tert-butylperoxy) butylvalerate, ethyl-3,3-di-(tert-butylperoxy) butyrate, 1,1-di-(tert-butylperoxy)-3,5,5-trimethylcyclohexane, 1,1-di-(tert-butylperoxy) cyclohexane, tert-butyl peroxybenzoate, and mixtures thereof. Even more preferred are dicumyl peroxide, 1,3-bis(tert-butylperoxyisopropyl) benzene, 1,4-bis(tert-butylperoxyisopropyl) benzene, mixtures of bis(tert-butylperoxyisopropyl) benzenes, 2,5-dimethyl-2,5-di (tert-butylperoxy) hexane, and 1,1-di-tert-butylperoxy-3,3,5-trimethylcyclohexane and mixtures thereof. The most preferred peroxides are (m and/or p) bis(tert-butylperoxyisopropyl) benzene, dicumyl peroxide, and 2,5-(tert-butylperoxy)-2,5-dimethylhexane.

The softening agent is selected from one or more low-molecular weight polymers, including liquid EP(D)Ms, alkylbenzenes, plasticizers, and/or waxes. Of these softening agents low-molecular weight polymers and alkylbenzenes are preferred because they generally have a preferred viscosity profile. If an EP(D)M is used, it is preferred to use one that is liquid at room temperature. For reference purposes, a Brookfield viscosity of 10,000 poises at 60° C. is considered to correspond to a viscosity of about 100,000 mPa·s at 100° C. The exact value of course depends on the viscosity of the type of product concerned. The softening agent is to be used in an effective amount. The amount is considered to be effective if a reduction of the mixing time of at least 10% is observed when comparing a composition of only peroxide(s) and mineral filler(s) with the same composition further comprising the softening agent(s) in a mixing test as described below under "procedures." Generally, the softening agent(s) make(s) up for 2–70 wt. % of the total composition, depending on which other ingredients are used and the desired hardness of the final composition. A concentration of 10–70 wt. %, preferably 20–60 wt. %, has been used advantageously in compositions with low hardness and/or high loads of filler. However, soft granules have been produced successfully with 2–40 wt. %, preferably 2.5–35 wt. % of a softening agent preferably selected from one or more alkylbenzenes, paraffinic and/or naphtenic oils, PO/EO copolymers, and polyisobutylene. For such soft granular compositions, even more preferred compositions comprise from 3 to 30 wt. % of softening agent, while most preferably they contain 3.5–25 wt. %.

The softening agents used in the preferred granulated compositions according to the invention are characterized in that they preferably are liquid, non-elastomeric compounds with a viscosity between 5 mPa·s at 20° C. and 60,000 mPa·s at 100° C. The term "non-elastomeric" is used to indicate that the softening agents according to the invention do not encompass rubbery (elastomeric) products. More particularly, non-elastomeric typically means that, at temperatures from 5° C. to 10° C., the elastic modulus of the material is outside of the range of 106–108 dynes/cm. More specifically, the softening compound preferably is selected from the group of compounds consisting of low-molecular weight polymers, alkylbenzenes, plasticizers, and waxes. Preferably the softening compound is a low-molecular weight polymer or alkylbenzene. The low-molecular weight polymers include liquid EP(D)M, liquid polybutadiene, liquid 1,4-polyisoprene, liquid resins with both aliphatic and aromatic units, poly-(linear or branched)-alkylbenzenes, and PO/EO copolymers. Preferably, the molecular weight of the low-molecular weight polymer is less than 10,000 Dalton. The term alkylbenzenes is used for all types of both linear and branched alkyl benzenes as known to the skilled man. The group of plasticizers includes paraffinic oils, aromatic (e.g. naphthenic) oils, aromatic/paraffinic oils, silicon oils, and various ethers or esters, such as esters from thioglycolic or alkylsulfonic acids, adipates, phtahalates, polyglycol ethers, polythio ethers, butylcarbinol formal, and polyester polythio ethers. Of the softening agents, silicon oils, compounds with acid or ester groups, and aromatic compounds are less preferred because of environmental reasons and/or because they are not generally applicable. The most preferred softening agents are selected from low-molecular weight polymers. Preferably, the viscosity of the softening agent is less than 50,000 mPa·s at 100° C., more preferably less than 20,000 mPa·s at 100° C., while most preferably the viscosity is lower than 10,000 mPa·s at 100° C. The lower maximum viscosity of the softening agent facilitates the process to make the granular peroxide composition according to the invention.

EP(D)M with a Brookfield viscosity of 10,000 poises or less at 60° C., as can be used as a softening agent in the cross-linking composition of the present invention, can be produced by solution polymerization, suspension polymerization or vapour phase polymerization, etc., as is known to the skilled person. Generally, solution polymerization is preferred. For its production, monomers (ethylene and propylene in the case of EPM, and ethylene, propylene, and a diene selected from dicyclopentadiene, ethylidene norbornene, 1,4-hexadiene, etc. in the case of EPDM), polymerization catalyst (organic metal compound), and solvent are supplied to a polymerization reactor and polymerized at a reaction temperature of −20° C. to 70° C. for a period of time and under conditions (e.g. hydrogen pressure) necessary for the intended physical properties of the product.

In addition to the above-mentioned organic peroxide and softening agent, the compositions according to the invention can contain one or more of the inorganic fillers typically used for processing elastomers, provided the storage stability of the cross-linking composition is not impaired. Preferred inorganic fillers include precipitated calcium carbonate, heavy calcium carbonate, talc, clay, such as kaolin, silica, silicate, carbon black, alumina gel, etc., and mixtures thereof. The inorganic filler can also be treated on the granule surface with a fatty acid or silane based coupling agent, etc.

The filler, or mixture of fillers, generally is present in amount of from 20 to 80 wt. % of the total composition, preferably from 25 to 60 wt. %. Most preferably, a mixture of silica and chalk is used. In this case, the selected silica content is from 10 to 50 wt. % of the total composition, preferably from 20 to 40 wt. %, while the concentration of the chalk, on the total composition, is less than 50 wt. %, preferably between 2 and 40 wt. %. Depending on the desired properties of the final composition of the formulation, it is preferred to have an amount of inorganic filler of 40 wt. % or less, based on the total weight of the composition.

Furthermore, the cross-linking composition of the present invention can contain one or more polymers, as long as the storage stability of the cross-linking composition is not impaired. The polymers which can be used here include conventional EP(D)M with a Mooney viscosity of about 20 to 150 (ML 1+4 at 100° C.), ethylene vinyl acetate copolymer, natural rubber, polybutadiene, polyisoprene, polybutylene, polyisobutylene, polyacrylates, styrene butadiene copolymer, acrylonitrile butadiene copolymer, hydrogenated acrylonitrile butadiene copolymer, acrylonitrile butadiene styrene terpolymer, fluorine rubber, silicone rubber, urethane rubber, polyethylene, polypropylene, chlorinated polyethylene, chlorinated polypropylene, chlorosulfonated polyethylene, etc.

The polymer that is optionally added to the cross-linking composition of the present invention is selected to suit the elastomer to be cross-linked. It is preferred that the polymer content in the cross-linking composition of the present invention is 55 wt. % or less, based on the total weight of the final cross-linking composition. More preferably, the composition comprises less than 30 wt. % of polymer. For the preferred soft granular compositions, the amount of polymer preferably is less than 10, more preferably less than 5, and most preferably less than 2, wt. %.

The polymer can be used together with the above-mentioned inorganic filler. When both one or more polymers and one or more inorganic fillers are used, it is preferred that the sum of these compounds account for at most 60 wt. % of the final cross-linking composition.

The cross-linking composition of the present invention may further comprise optional ingredients like antioxidants, ultraviolet light absorbers, flame retarders, pigments, dyes, process oils, lubricants, scorch retarders, co-agents, coupling agents, such as vinylsilanes and titanates, etc., if such products do not adversely affect the storage stability of the cross-linking composition. Preferably, the compositions do not comprise free fatty acids.

In the preferred soft granular compositions, further optional ingredients are scorch retarders and co-agents. More preferably, however, the soft granulates do not comprise these further ingredients in order to improve their properties and applicability in cross-linking processes. The scorch retarders, if used, are to be present in the soft granular compositions in an amount of less than 2.5 wt. %, based on the weight of the total composition, and are of the conventional type. Higher levels are not attractive, since that would limit the flexibility of the compounder when using the compositions according to the invention in rubber formulations. Levels below 2.0% are preferred, while formulations essentially free of scorch retarder are most preferred, since scorch retarders can also interfere with the granulating step of the process according to the invention. Typical examples of scorch retarders are mono-tert-C4–8 hydroquinone, 2,5-di-tert-C4–8 quinone, mono-1-methylcyclohexyl-1-quinone, and 2,5-di-(1-methylcyclohexyl-1) quinone.

If used in the granular compositions of the invention, co-agents are to be present in an amount of less than 7.5 wt. %, based on the weight of the total composition, and are of the conventional type. Higher levels are not attractive, since that would limit the flexibility of the compounder when using the compositions according to the invention in rubber formulations. Preferably, the co-agent level is below 5 wt. %. More preferably, it is below 2.5 wt. %, while the most preferred granular compositions are essentially free of co-agents, since they can also interfere with the granulating step of the process according to the invention. Typical examples of co-agents according to the invention are triallylcyanurate (TAC), triallylisocyanurate (TAIC), triallylphosphate, triallyltrimellitate, triallylcitrate, diallyl compounds, di(meth)acrylates, trimethacrylates, such as trimethylolpropane trimethylacrylate (TRIM), bismaleimides, and mixtures thereof. Of the coagents, the trifunctional coagents are preferred. Most preferred are TAC, TAIC, and TRIM.

The cross-linking composition of the present invention can be produced by mixing said respective ingredients.

Preferably, the organic peroxide is added last to the mixing device. The mixing device can be any conventionally used piece of equipment, such as Banbury mixers, kneaders, extruders, transfer mixers, open roll mills, planetary mixers, etc. The skilled person will know which equipment to select to efficiently mix the said ingredients. The cross-linking composition of the present invention obtained by mixing the respective ingredients is produced as sheets, grains or paste by subsequent shaping, if so desired. Shaping can be done in any conventional way, for instance by means of an extruder, a granulator, a pelletizer, a cutting machine, or by an extrusion press such as supplied by Amandaus Kahl. The actual shape of the granulated compositions according to the invention will depend on the type of shaping equipment that is used. They can be in the form of prills/pastilles, rods, briquettes, and the like. The most preferred form is the one resulting from a chopped strand, usually called extrudates or granulates.

Although the sequence in which the raw materials are charged to the mixer is not critical, it is preferred to charge the mixer successively with: a) if used, filler, b) softening agent, c) optional additives, and d) peroxide. Preferably, components a–c are mixed thoroughly before component d) is added. The peroxide preferably is distributed homogeneously over the other ingredients during this mixing step. The skilled man will know how to intimately mix the ingredients to assure such homogeneous distribution. For peroxides which are liquid at room temperature, hereinafter called liquid peroxides, it is preferred to spray the peroxide over the other ingredients. In order to obtain a homogeneous mixture of peroxides which are solid at room temperature, hereinafter called solid peroxides, it is preferred to use long mixing times to finely divide the peroxide and/or to incorporate a heating step so that the peroxide will be (partly) melted during mixing. Optionally, the solid peroxide is melted before it is mixed with the other ingredients. In that case, however, the peroxide dosing rate and the mixing conditions are to be controlled carefully to avoid lump formation. Alternatively, the solid peroxide is not melted during the first mixing step, but during the subsequent granulating step. Although it is not required, it can be advantageous to perform the mixing step under a nitrogen blanket, for instance for safety considerations.

The mixing of the ingredients is to be performed at a temperature at which the peroxides to be formulated do not show excessive decomposition. For safety reasons it is preferred to mix the ingredients at a temperature at least 40° C. below the ten hour half-life temperature of the (least stable) peroxide. In this way it is possible to make granulates according to the invention in a safe and economical way. For liquid peroxides, the preferred mixing temperature is below 60° C. if this is less than 40° C. below the ten hour half-life temperature.

The soft granular compositions are preferably manufactured by mixing of the raw materials in low shear mixer, such as a conical screw mixer or "Nauta" mixer, followed by shaping the mixture.

In a second embodiment, the invention relates to the use of the above-mentioned cross-linking peroxide compositions in elastomers, thermoplasts, and compositions thereof. Preferably, the peroxide composition is blended into the elastomer/thermoplast formulation by the use of well-known mixing devices. Particularly suitable devices are two-roll mills, extruders, and kneaders. Due to the presence of the softening agent in the granulate, the peroxide is distributed evenly and rapidly over the elastomer/thermoplast, without the presence of the optional filler having an adverse effect.

Preferably, the distribution rate over the elastomer/thermoplast is as good (high) as for conventional masterbatches. As a result, the cross-linking process of the elastomers/thermoplasts in general, the blending step coming at an early stage, is improved.

The elastomers which can be cross-linked include EP(D)M, ethylene vinyl acetate copolymer, natural rubber, polybutadiene, polyisoprene, polybutylene, polyisobutylene, polyacrylates, styrene butadiene copolymer, acrylonitrile butadiene copolymer, hydrogenated acrylonitrile butadiene copolymer, acrylonitrile butadiene styrene terpolymer, fluorine rubber, silicone rubber, urethane rubber, polyethylene, polypropylene, chlorinated polyethylene, etc.

The cross-linking composition of the present invention can be used in an amount of 0.2 to 20 wt. %, preferably 1 to 10 wt. %, based on the weight of the cross-linkable elastomer.

Cross-linking can be effected by any conventional method. For example, the cross-linking composition of the present invention and a cross-linkable elastomer are homogeneously mixed by a mixing machine such as an open roll mill or kneader, and heat-treated by a press or extruder, etc. at 140 to 200° C. for 5 to 30 minutes, to cross-link the elastomer.

The cross-linking compositions of the present invention have excellent storage stability, since they do not harden and do not allow the organic peroxide to migrate to the surface even when they are stored for a long time and contain up to 80 wt. % of organic peroxide. Furthermore, the elastomers cross-linked by using the cross-linking composition have excellent mechanical properties.

EXPERIMENTAL

Materials Used:
Ketjensil® SM 500 (silica) ex Akzo PQ Silica
Silica HDK N-20 (silane treated silica) ex Wacker
Carbon black N-772 ex Cabot
Carbon black N-550 ex Cabot
Perkadox® 14 (bis(tert-butylperoxyisopropyl) benzene of 94% purity) ex Akzo Nobel
Perkadox® BC (dicumyl peroxide) ex Akzo Nobel
Trigonox® 101 (2,5-(tert-butylperoxy)-2,5-dimethylhexane) ex Akzo Nobel
Trigonox® 29 (1,1-di-(tert-butylperoxy)-3,5,5-trimethylcyclohexane) ex Akzo Nobel
Trigonox® 17 (4,4-di-(tert-butylperoxy)butylvalerate) ex Akzo Nobel)
Kayacumyl® D (dicumyl peroxide) ex Kayaku Akzo Corp.
Trilene® CP40 (EPM liquid polymer) ex Uniroyal Chemical
Trilene® 54 (EPDM-DCP liquid polymer) ex Uniroyal Chemical
TRILENE® 66 (EPDM-ENB liquid polymer) ex Uniroyal Chemical
Trilene® 67 (EPDM-ENB liquid polymer) ex Uniroyal Chemical
Trilene® CP80 (EPM liquid polymer) ex Uniroyal Chemical
Isolene® 40S (polyisoprene liquid polymer) ex Harcros Chemicals
Napvis® 3 (polybutene liquid polymer) ex BP Chemicals
Napvis® 200 (polybutene liquid polymer) ex BP Chemicals
Isorchem® 113 (linear alkylbenzene) ex Condea Augusta
Escorez® 2520 (liquid resin containing aliphatic and aromatic units) ex Exxon Chemical
Sunpar® 150 (paraffin oil) ex Sunoco
Sunpar® 2280 (paraffin oil) ex Sunoco
Haftolat® (solution EPM) ex Kettlitz
ZE2010® (silicone rubber) ex Toshiba Silicone Precarb® 100 (chalk) ex Schaefer Kalk
Genapol® D PF20 (PO/EO copolymer) ex Hoechst
Keltan® 578 (EPDM) ex DSM
Mitsui® EPT3045 (EPDM), ex Mitsui Petrochemical Industries, Ltd.

All other chemicals were standard grade and used without purification.

Procedures:

The distribution rate (expressed as mixing time) of the peroxide over the elastomer was analyzed as follows:

First an EPDM compound was produced by compounding, in a 5 liter internal mixer made by Werner & Pfleiderer, 1.6 kg of Keltan® 578, 1.12 kg of carbon black N-772, 1.12 kg of carbon black N-550, and 0.8 kg of SumPar® 2280.

The compounding conditions were:

| | |
|---|---|
| start temperature: | 50° C. |
| rotor speed: | 50 rpm |
| cooling: | from the start (water temperature approx. 20° C.) |
| t = 0 | addition of all ingredients, except the rubber |
| t = 0.5 minutes | addition of rubber |
| t = 3 minutes | sweep ram (cleaning of the piston of the mixing device) |
| t = 4 minutes | discharge of the mixer |

For the actual blending test a two-roll mill (Schwabenthal) is used. Conditions:

| | |
|---|---|
| dimensions of the two-roll mill: | 150 × 350 mm |
| roll temperature: | 65–70° C. |
| speed of rolls: | 21 mm |
| friction of rolls | none |
| distance between rolls | 1.2 mm |

300 g of the EPDM compound are put onto the rolls and after sheet forming 50 g of the peroxide composition are added. The mixing time, i.e. the time from the moment the peroxide composition is added to the moment when it has disappeared in the rubber, is reported.

The friability of the peroxide compositions (the tendency of particles to break down in size during handling) is determined according to the method (SMA) F/84.1-4 as available from Akzo Nobel. According to this method, the percentage loss of weight on rolling and impact of a compacted powder material is determined by analyzing the decrease in weight of particles with a size greater than 250 μm after the product is subjected to rotation in a "Roche"-type drum using a so-called friabilator. Friabilators are available from, for instance, Pharma Test (Hamburg, Germany) and Erweka (Heusenstamm Germany).

The 10-hour half life temperature refers to the temperature at which 50wt. % of the organic peroxide is thermally decomposed in 10 hours (in a benzene solution with an organic peroxide concentration of 0.2 mole/l).

The Brookfield viscosity specified for the softening agent as used in the cross-linking composition of the present invention refers to values obtained with a Brookfield viscosimeter type RV, using a spindel #7, at the indicated temperature.

EXAMPLES

Example 1

Kayacumyl® D (purity 99%) and TRILENE®-40 (Brookfield viscosity 210 poises at 60° C.) were mixed at a ratio shown in Table 1, and homogeneously kneaded by a kneader to obtain a pasty cross-linking composition of the present invention.

Example 2

Trigonox® 29, TRILENE®-CP80 (Brookfield viscosity 3,600 poises at 60° C.), TRILENE®-54 (Brookfield viscosity 2200 poises at 60° C.), heavy calcium carbonate, and silica were mixed at a ratio shown in Table 1, kneaded by an open roll mill, and cut by a cutting machine, to obtain a sheet-like cross-linking composition of the present invention.

Example 3

Perkadox® 14, TRILENE®-67 (Brookfield viscosity 6,900 poises at 60° C.), Mitsui® EPT3045 (Mooney viscosity 38), and precipitated calcium carbonate were mixed at a ratio shown in Table 1, kneaded homogeneously by an open roll mill, and pelletized to obtain a granular cross-linking composition of the present invention.

Example 4

Kayahexa AD, corresponding to Trigonox® 101, TRILENE®-66 (Brookfield viscosity 6,400 poises at 60° C.), ZE2010®, and silica were mixed at a ratio shown in Table 1 and homogeneously kneaded by a kneader, to obtain a pasty cross-linking composition of the present invention.

The cross-linking compositions as obtained in Examples 1 to 4 were stored at 25° C. or 40° C. for stability tests.

In Table 1, the hardness was measured using a rubber tester Type C, while all values are given in wt. % of the total composition.

TABLE 1

| | Example 1 | Example 2 | Example 3 | Example 4 |
|---|---|---|---|---|
| Organic peroxide | Kayacumyl D | Trigonox 29 | Perkadox 14 | Kayahexa AD |
| Amount (pure peroxide), parts by weight (pbw) | 40.1 | 50.3 | 60.1 | 70.0 |
| Liquid EPM | Trilene CP4O | Trilene CP80 | | |
| Amount (pbw) | 59.5 | 15.0 | | |
| Liquid EPDM | | Trilene 54 | Trilene 67 | Trilene 66 |
| Amount (pbw) | | 15.0 | 15.7 | 10.0 |
| Inorganic filler | | Silica | Precipitated calcium carbonate | Silica |
| Amount (pbw) | | 9.8 | 7.0 | 4.7 |
| Amount of heavy calcium carbonate (pbw) | | 7.3 | | |

TABLE 1-continued

|  | Example 1 | Example 2 | Example 3 | Example 4 |
|---|---|---|---|---|
| Polymer |  |  | Mitsui EPT 3045 | Silicone rubber |
| Amount (pbw) |  |  | 16.6 | 10.0 |
| Properties of obtained cross-linking composition |  |  |  |  |
| Form | Paste | Sheets | Grains | Paste |
| Exudation | Nil | Nil | Nil | Nil |
| Hardness | 33 | 47 | 59 | 29 |
| Storage stability test (25° C./4 weeks) |  |  |  |  |
| Retention rate of organic peroxide (%) | 99.4 | 98.5 | 99.0 | 98.6 |
| Exudation | Nil | Nil | Nil | Nil |
| Hardness | 35 | 45 | 60 | 29 |
| Storage stability test (40° C./4 weeks) |  |  |  |  |
| Retention rate of organic peroxide (%) | 98.4 | 97.1 | 98.2 | 97.7 |
| Exudation | Nil | Nil | Nil | Nil |
| Hardness | 37 | 44 | 62 | 28 |

Examples 5 to 8

The respective ingredients shown in Table 2 were mixed at the ratios shown to obtain elastomer compositions, which were then cross-linked at 180° C. for 15 minutes. The cross-linking properties of these elastomer compositions were measured using a rheometer. $T_{10}$ means the time taken to reach 10% of the maximum torque. $T_{90}$ means the time taken to reach 90% of the maximum torque. For the cross-linked elastomers, a tensile test and a tearing test according to JIS K 6301 were performed. $T_b$ stands for tensile strength at the time of breakage; $E_B$ for elongation at the time of breakage; $H_S$ for spring hardness; and TR for tear strength. The mixing ratios of the cross-linking compositions and the test results are shown in Table 2.

In Table 2, JSR®-EP86 is a brand of EPDM, produced by Japan Synthetic Rubber Co., Ltd. The HAF carbon black used was the #70 produced by Asahi Carbon, and the naphthene based process oil used was the Sunpar® 2280 produced by Nippon Sun Sekiyu. The antioxidant used was a phenol based antioxidant Irganox® 1010 ex Ciba Geigy. TMPT stands for trimethylolpropane trimethacrylate.

TABLE 2

|  | Example 5 | Example 6 | Example 7 | Example 8 |
|---|---|---|---|---|
| JSR-EP86 | 100 | 100 | 100 | 100 |
| HAF carbon black | 50 | 50 | 50 | 50 |
| Naphthene based process oil | 10 | 10 | 10 | 10 |
| Antioxidant | 2 | 2 | 2 | 2 |
| TMPT | 2 | 2 | 2 | 2 |
| Stearic acid | 1 | 1 | 1 | 1 |
| Zinc oxide | 5 | 5 | 5 | 5 |
| Cross-linking composition. of Example 1 | 6.8 |  |  |  |
| Cross-linking composition of Example 2 |  | 6.7 |  |  |
| Cross-linking composition of Example 3 |  |  | 3.4 |  |
| Cross-linking composition of Example 4 |  |  |  | 4.8 |
| Cross-linking properties |  |  |  |  |
| T10 (min) | 1.3 | 1.5 | 1.3 | 1.2 |
| T90 (min) | 7.8 | 8.9 | 7.9 | 7.8 |
| Max torque (kgf/cm) | 34 | 33 | 34 | 35 |
| Tensile test |  |  |  |  |
| $T_B$ (kgf/cm²) | 160 | 175 | 157 | 155 |
| $E_B$ (%) | 450 | 490 | 430 | 420 |
| $H_S$ (JIS A) | 71 | 70 | 71 | 71 |
| Tearing test |  |  |  |  |
| TR (kgf/cm) | 43 | 40 | 45 | 41 |

From the results of Table 2 it can be seen that the cross-linking compositions of the present invention are excellent in cross-linking properties and can give cross-linked rubbers excellent in mechanical strength such as tensile strength and tear strength.

Examples 9–11

Using a conical screw mixer the following soft granulate recipes were formulated. The amounts of the ingredients are expressed in parts by weight of the total composition (wt. %). First the silica and/or chalk and the softening agent were mixed for 5 minutes at ambient temperature. Subsequently, molten peroxide of about 60° C. was added during approximately 15 minutes. To completely homogenize the mixture, mixing was continued for another hour. Next the product was extruded and granulated using a laboratory granulator. The laboratory granulator used was controlled at 20° C. by means of a water jacket and had a manually operated ramrod of 12 cm² on which a pressure of 70 kN was applied.

| Recipe Example | 9 | 10 | 11 |
|---|---|---|---|
| Silica SM 500 | 33 | 21 | 33 |
| Precarb ® 100 | 4 | 16 | 4 |
| Softening agent | 20 | 20 | 20 |
|  | Trilene ® CP40 | Napvis ® 200 | Isolen ® 40 |
| Perkadox ® 14 | 43 | 43 | 43 |

| Properties of the granulate | | | |
|---|---|---|---|
| Example | 9 | 10 | 11 |
| Mixing time (min.) | 5.3 | 7.0 | 5.0 |

Examples 12–15

Following the procedure of Example 9, 13 wt. % of Silica SM 500, 40 wt. % of Precarb® 100, and 4 wt. % of softening agent were mixed with 43 wt. % of Perkadox® 14. The following table lists the types of softening agents used and the properties of the resulting granulates.

| Example | 12 | 13 | 14 | 15 |
|---|---|---|---|---|
| Softening agent | Napvis ® 3 | Isorchem ® 113 | Escorez ® 2520 | Sunpar ® 150 |
| mixing time (min.) | 3.3 | 4.3 | 4.2 | 5.2 |

Examples 16 and 17 and Comparative Examples A and B

Following the procedure of Example 9, Perkadox® BC was formulated in Examples 16 and 17 according to the following table. In Comparative Example A a commercial masterbatch of Perkadox® BC, comprising an EP(D)M rubber and chalk, was used (Perkadox® BC-40MB ex Akzo Nobel). In Comparative Example B a commercial formulation of Perkadox® BC on a chalk carrier was used (Perkadox® BC-40B ex Akzo Nobel).

| Example | 16 | 17 | A | B |
|---|---|---|---|---|
| Silica SM 500 | 27 | 14 | n.r. | n.r. |
| Precarb ® 100 | 9 | 40 | n.r. | n.r. |
| Haftolat ® | 22 | 4 | none | none |
| Perkadox ® BC | 42 | 42 | 40 | 40 | n.r. = not relevant

| The properties of the resulting granulates were as follows: | | | | |
|---|---|---|---|---|
| Example | 16 | 17 | A | B |
| mixing time (min.) | 3.3 | 2.3 | 3.1 | 16 |
| friability | slight | slight | no | significant |

Examples 18–20

Here use was made of the formulations of Trigonox® 101, 17, and 29 using about 13 wt. % Haftolat and 2 wt. % Genapol PF20.

| Example | 18 | 19 | 20 |
|---|---|---|---|
| Silica SM 500 | 40 | 36 | 39 |
| Precarb ® 100 | 2 | 7 | 4 |
| Peroxide | 43 | 42 | 42 |
|  | Trigonox ® 101 | Trigonox ® 17 | Trigonox ® 29 |

| Properties of the granulate | | | |
|---|---|---|---|
| Example | 18 | 19 | 20 |
| Mixing time (min.) | 2.2 | 3 | 2.5 |
| Exudation after storage at 40° C. and −20° C. | not visible | not visible | not visible |

Examples 21–23

In Example 21 a formulation of Trigonox® 29 comprising 2 wt. % of a scorch retarder (2,5-di-tert.amyl quinone) and 5 wt. % of a co-agent (tri-allyl trimellitate) was made and evaluated. Examples 22 and 23 are Perkadox® 14 compositions with high initiator and softening agent concentrations, respectively.

| Example | 21 | 22 | 23 |
|---|---|---|---|
| Silica SM 500 | 29.25 | 17.6 | 12.5 |
| Silica HDK N-20 | none | 5.0 | 9.0 |
| Precarb ® 100 | 17.2 | none | none |
| Peroxide | 42.8 | 75.4 | 41 |
| Softening agent | Haftolat ® 3.75 | Napvis ® 3 2.0 | Haftolat ® 37.5 |
| Scorch retarder | 2.0 | none | none |
| Co-agent | 5.0 | none | none |

| Properties of the granulate | | | |
|---|---|---|---|
| Example | 21 | 22 | 23 |
| Mixing time (min.) | 5.15 | 10.15 | 2.25 |
| Exudation after storage at 40° C. and −20° C. | not visible | not visible | not visible |

What is claimed is:

1. A soft granulate which can be used for cross-linking thermoplastic resins and elastomers comprising a) 20 to 80 wt. %, based on the weight of the total granulate, of at least one organic peroxide, b) an effective amount of one or more softening agents, for improving the blending of the peroxide in a resin and/or elastomer, which softening agent or agents is or are selected from the group consisting of low-molecular weight polymers, waxes and mixtures thereof with said softening agent having a Brookfield viscosity of 10,000 poised or less at 60° C., c) at least one filler, which soft granulate does not comprise hydroquinone derivatives, and which soft granulate is essentially free of trans-polyoctenamer rubber.

2. A soft granulate according to claim 1 wherein the softening agent is present in an amount from 2 to 70 wt. %, based on the weight of the total granulate.

3. A soft granulate according to claim 1 wherein the softening agent is a liquid EPM or liquid EPDM.

4. A soft granulate comprising the composition of claim 1 wherein the softening agent is a low-molecular weight polymer with a maxim viscosity of 50,000 mPa·s, at 100° C., and a minimum viscosity of 3 mPa·s at 100° C.

5. A granulate according to claim 4 wherein the softening agent is an alkylbenzene with a minimum viscosity of 5 mPa·s, at 20° C., and a maximum viscosity of 2,500 mPa·s at 20° C.

6. A soft granulate according to claim 1 wherein the peroxide(s) represent(s) 20–80 wt. % if one or more solid peroxides are used, or 20–70 wt. % if one or more liquid peroxides are used, the filler(s) represent(s) 20 to 80 wt. %, and the softening agent(s) represent(s) 2 to 40 wt. % of the composition, all based on the weight of the total composition.

7. A granulate according to claim 6 containing 30–60 wt. % of one or more peroxides, 25 to 60 wt. % of one or more fillers, and 2.5 to 35 wt. % of one or more softening agents, all expressed as percentages of the weight of the total composition.

8. A granulate according to claim 7 wherein the fillers comprise silica and chalk so that the silica content of the final composition is from 10 to 50 wt. % and the chalk content of the final composition is less than 50 wt. %, all expressed as percentages of the weight of the total composition.

9. A process to make granulated compositions according to any one of claims 1 and 4–8 involving the steps of:
   mixing mineral filler(s) and softening agent(s) to form mixture A,
   if appropriate, completing mixture A by blending in further ingredients
   adding liquid, solid or molten cross-linking peroxide(s) to mixture A,
      mixing said ingredients for at least 10 minutes at a temperature that is at least 40° C. below the ton hour half-life temperature of the peroxide, and
      shaping the resulting powder into granules using conventional granulating equipment.

10. A process of mixing an elastomer, thermoplast or a formulation thereof with a composition in accordance with any of claims 1–3 and 4–7.

11. A process according to claim 10 wherein the process further comprises the step of cross-linking said elastomer, thermoplast or formulation.

12. A composition according to claim 1 wherein the softening agent has a viscosity between 5 mPa·s at 20° C. and 60,000 mPa·s at 100° C.

13. A composition according to claim 4 wherein the softening agent has a maximum viscosity of 20,000 mPa·s at 100° C.

14. A composition according to claim 4 wherein the softening agent has a maximum viscosity of 10,000 mPa·s at 100° C.

15. A granulate according to claim 5 wherein the softening agent has a minimum viscosity of 20 mPa·s at 20° C.

16. A granulate according to claim 5 wherein the softening agent has a minimum viscosity of 40 mPa·s at 20° C.

17. A soft granulate according to claim 1 comprising further additives.

18. A soft granulate according to claim 17 wherein the softening agent is present in an amount from 2 to 70 wt. %, based on the weight of the total granulate.

19. A soft granulate according to claim 17 wherein the softening agent is a liquid EPM or liquid EPDM.

20. A soft granulate comprising the composition of claim 17 wherein the softening agent is a low-molecular weight polymer with a maximum viscosity of 50,000 mPa·s, at 100° C., and a minimum viscosity of 3 mPa·s at 100° C.

21. A granulate according to claim 20 wherein the softening agent is an alkylbenzene with a minimum viscosity of 5 mPa·s, at 20° C., and a maximum viscosity of 2,500 mPa·s at 20° C.

22. A granulate according to claim 17 wherein the peroxide(s) represent(s) 20–80 wt. % if one or more solid peroxides are used, or 20–70 wt. % if one or move liquid peroxides are used, the filler(s) represent(s) 20 to 80 wt. %, and the softening agent(s) represent(s) 2 to 40 wt. % of the composition, all based on the weight of the total composition.

23. A granulate according to claim 22 containing 30–60 wt. % of one or more peroxides, 25 to 60 wt. % of one or more fillers, and 2.5 to 35 wt. % of one or more softening agents, all expressed as percentages of the weight of the total composition.

24. A granulate according to claim 23 wherein the fillers comprise silica and chalk so that the silica content of the final composition is from 10 to 50 wt. % and the chalk content of the final composition is less than 50 wt. %, all expressed as percentages of the weight of the total composition.

25. A process to make granulated compositions according to any one of claims 17 and 20–24 involving the steps of:
   mixing mineral filler(s) and softening agent(s) to form mixture A,
   if appropriate, completing mixture A by blending in further ingredients
   adding liquid, solid or molten cross-linking peroxide(s) to mixture A,
      mixing said ingredients for at least 10 minutes at a temperature that is at least 40° C. below the ten hour half-life temperature of the peroxide, and
   shaping the resulting powder into granules using conventional granulating equipment.

26. A process of mixing an elastomer, thermoplast or a formulation thereof with a composition in accordance with any of claims 17 and 20–24.

27. A process according to claim 26 wherein the process further comprises the step of cross-linking said elastomer, thermoplast or formulation.

28. A composition according to claim 17 wherein the softening agent has a viscosity between 5 mPa·s at 20° C. and 60,000 mPa·s at 100° C.

29. A composition according to claim 20 wherein the softening agent has a maximum viscosity of 20,000 mPa·s at 100° C.

30. A composition according to claim 20 wherein the softening agent has a maximum viscosity of 10,000 mPa·s at 100° C.

31. A granulate according to claim 21 wherein the softening agent has a minimum viscosity of 20 mPa·s at 20° C.

32. A granulate according to claim 21 wherein the softening agent has a minimum viscosity of 40 mPa·s at 20° C.

* * * * *

UNITED STATES PATENT AND TRADEMARK OFFICE
CERTIFICATE OF CORRECTION

PATENT NO.     : 6,610,768 B1                                    Page 1 of 1
DATED          : August 26, 2003
INVENTOR(S)    : Jernej Jelenic et al.

It is certified that error appears in the above-identified patent and that said Letters Patent is hereby corrected as shown below:

Column 15,
Line 10, change "maxim" to -- maximum --

Column 16,
Line 16, change "move" before "liquid" to read -- more --

Signed and Sealed this

Fourteenth Day of October, 2003

JAMES E. ROGAN
*Director of the United States Patent and Trademark Office*